United States Patent
Etienne-Cummings et al.

(10) Patent No.: US 10,925,269 B2
(45) Date of Patent: Feb. 23, 2021

(54) ACTIVE ECHO FISHING LURE

(71) Applicant: THE JOHNS HOPKINS UNIVERSITY, Baltimore, MD (US)

(72) Inventors: Ralph Etienne-Cummings, Washington, DC (US); Emad Boctor, Baltimore, MD (US); Xiaoyu Guo, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 959 days.

(21) Appl. No.: 15/009,920

(22) Filed: Jan. 29, 2016

(65) Prior Publication Data
US 2016/0235046 A1 Aug. 18, 2016

Related U.S. Application Data

(60) Provisional application No. 62/109,250, filed on Jan. 29, 2015.

(51) Int. Cl.
*A01K 85/01* (2006.01)
*G01S 15/96* (2006.01)
(Continued)

(52) U.S. Cl.
CPC .............. *A01K 85/01* (2013.01); *A01K 99/00* (2013.01); *G01S 7/521* (2013.01); *G01S 7/56* (2013.01);
(Continued)

(58) Field of Classification Search
None
See application file for complete search history.

(56) References Cited

U.S. PATENT DOCUMENTS

| 284,056 A | * | 8/1883 | Pflueger | A01K 85/01 43/17.6 |
| 841,429 A | * | 1/1907 | Passage | A01K 85/01 43/42.31 |

(Continued)

FOREIGN PATENT DOCUMENTS

| WO | 2002100166 A2 | 12/2002 |
| WO | 2014014958 A1 | 1/2014 |

OTHER PUBLICATIONS

Handoko, et al., (2009) "Using Echo Ultrasound from Schooling Fish to Detect and Classify Fish Types", Journal of Bionic Engineering, vol. 6, No. 3, pp. 264-269.
(Continued)

*Primary Examiner* — Isam A Alsomiri
*Assistant Examiner* — Amie M Ndure
(74) *Attorney, Agent, or Firm* — Harrity & Harrity, LLP

(57) ABSTRACT

An underwater imaging system is disclosed. A boat sonar transducer is configured to transmit and receive sonar signals and generate an image of water and surfaces using received sonar signals. An active echo system is configured to be positioned within the water to remotely communicate with the boat sonar transducer. The active echo system includes an ultrasound transducer configured to detect sonar signals transmitted by the boat sonar transducer and transmit an active echo pulse, or a series of active echo pulses, back to the boat sonar transducer. A microprocessor is configured to drive the ultrasound transducer to transmit the active echo pulse, or series of active echo pulses, back to the boat sonar transducer in response to the ultrasound transducer detecting sonar signals transmitted by the boat sonar transducer.

19 Claims, 6 Drawing Sheets

(51) Int. Cl.
*G01S 15/89* (2006.01)
*G01S 7/56* (2006.01)
*A01K 99/00* (2006.01)
*G01S 15/74* (2006.01)
*G01S 7/521* (2006.01)
*G01S 15/86* (2020.01)

(52) U.S. Cl.
CPC .............. *G01S 15/74* (2013.01); *G01S 15/86* (2020.01); *G01S 15/89* (2013.01); *G01S 15/96* (2013.01); *G01S 15/8904* (2013.01)

(56) References Cited

U.S. PATENT DOCUMENTS

| | | | | |
|---|---|---|---|---|
| 1,529,459 | A * | 3/1925 | Wunderlin | A01K 85/01 43/17.6 |
| 1,617,091 | A * | 2/1927 | Wunderlin | A01K 85/01 43/17.6 |
| 1,663,465 | A * | 3/1928 | Neff | A01K 85/01 43/17.6 |
| 1,961,539 | A * | 6/1934 | White | A01K 85/01 43/43.15 |
| 5,483,767 | A * | 1/1996 | Langer | A01K 79/02 43/4 |
| 5,511,335 | A * | 4/1996 | Langer | A01K 79/02 43/17.1 |
| 8,650,795 | B2 | 2/2014 | Johnson et al. | |
| 9,408,378 | B2 * | 8/2016 | Zenanko | A01K 91/06 |
| 2001/0023550 | A1 * | 9/2001 | Mathews, Jr. | A01K 85/01 43/17.1 |
| 2002/0002790 | A1 * | 1/2002 | Foss | A01K 85/01 43/17.5 |
| 2002/0007582 | A1 * | 1/2002 | Coppola, Jr. | A01K 85/01 43/42.06 |
| 2004/0105343 | A1 * | 6/2004 | Betts | A01K 93/02 367/99 |
| 2004/0180791 | A1 * | 9/2004 | Cass | A01K 85/01 43/42.31 |
| 2006/0191185 | A1 * | 8/2006 | Hansen | A01K 91/08 43/27.4 |
| 2007/0147173 | A1 * | 6/2007 | Park | G01S 7/521 367/107 |
| 2008/0080317 | A1 | 4/2008 | Inouchi et al. | |
| 2008/0159413 | A1 * | 7/2008 | Mehan | G06F 1/266 375/257 |
| 2009/0122647 | A1 * | 5/2009 | Betts | G01S 7/521 367/88 |
| 2012/0285071 | A1 * | 11/2012 | Eikebrokk | A01K 85/01 43/17 |
| 2013/0145673 | A1 * | 6/2013 | Babcock, III | A01K 85/00 43/42.06 |
| 2013/0333272 | A1 * | 12/2013 | Gravelle | A01K 85/01 43/42.32 |
| 2014/0057677 | A1 * | 2/2014 | Liubinas | G01S 15/96 455/556.1 |
| 2014/0259868 | A1 * | 9/2014 | Wilson | A01K 85/00 43/42.24 |
| 2018/0064081 | A1 * | 3/2018 | Gravelle | A01K 85/01 |

OTHER PUBLICATIONS

Colombo, et al., (2004) "Use of Ultrasound Imaging to Determine Sex of Shovelnose Sturgeon", North American Journal of Fisheries Management, vol. 24, pp. 322-326.

Matsushita, et al., (2012) "Decision-making of net shooting based on gathered fish school size in a coastal purse seine fishery" Nippon Suisan Gakkaishi, vol. 78, No. 5, pp. 878-884.

The Economist (2012) "The one that didn't get away".

* cited by examiner

ACTIVE ECHO FISHING LURE

CROSS REFERENCE TO RELATED APPLICATION

This application claims the benefit of U.S. Provisional Patent Application No. 62/109,250 filed on Jan. 29, 2015, which is incorporated by reference, herein, in its entirety.

FIELD OF THE INVENTION

The invention relates generally to aquatic fauna detection and, more particularly, to sonar systems used in fishing applications.

BACKGROUND

Consumer boat sonar systems are used to capture underwater ultrasound images depicting fish, schools of fish, underwater structure, and the depth of the water, among other things. The underwater ultrasound images are reconstructed based on the signal time-of-flight and phase of echo signals from an ultrasound transducer, typically attached to the bottom of the boat. The boat sonar systems typically operate in a frequency range between 100 kHz to 400 kHz, and are capable of providing underwater ultrasound images with a refresh rate of a few Hertz. However, these systems do not display lures or other fishing equipment.

Therefore, it would be advantageous to provide a sonar tracking system that provides tracking of the lure in addition to display of aquatic fauna, underwater structure, water depth and other information.

SUMMARY

The present invention provides an active echo system for a fishing lure or tracking of a fishing lure. Specifically, the present invention is capable of using the active echo system to interface with a boat sonar system and display the fishing lure on an under-water ultrasound images produced by the boat sonar system.

In one aspect, the present invention provides an underwater imaging system including a boat sonar transducer configured to be attached to an underside of a boat to transmit and receive sonar signals and generate an image of water and surfaces under the boat using received sonar signals. The underwater imaging system further includes an active echo system configured to be positioned within the water under the boat at a distance from the boat to remotely communicate with the boat sonar transducer. The active echo system includes an ultrasound transducer configured to detect sonar signals transmitted by the boat sonar transducer and transmit an active echo pulse, or a series of active echo pulses, back to the boat sonar transducer, and a microprocessor configured to drive the ultrasound transducer to transmit the active echo pulse, or series of active echo pulses, back to the boat sonar transducer in response to the ultrasound transducer detecting sonar signals transmitted by the boat sonar transducer.

In another aspect, the present invention provides a fishing lure including an active echo system for interfacing with a boat sonar system. The active echo system includes an ultrasound transducer configured to detect a signal from the boat sonar system and subsequently transmit an active echo pulse, or a series of active echo pulses, back to the boat sonar system. The active echo system further includes a signal amplifier configured to amplify the signal detected by the ultrasound transducer, an analog-to-digital converter configured to digitize the signal from the signal amplifier, and a microprocessor configured to receive the digitized signal from the analog-to-digital converter and control a pulser circuit. The pulser circuit drives the ultrasound transducer to transmit the active echo pulse, or the series of active echo pulses, back to the boat sonar system.

In yet another aspect, the present invention provides a fishing lure including an active echo system integrated into to the fishing lure for interfacing with a boat sonar system. The active echo system includes an ultrasound transducer configured to detect a signal from the boat sonar system and subsequently transmit an active echo pulse, or a series of active echo pulses, back to the boat sonar system. The active echo system further includes a signal amplifier configured to amplify the signal detected by the ultrasound transducer and trigger an analog trigger circuit, and a microprocessor configured to receive the signal from the analog trigger circuit and control a pulser circuit. The pulser circuit drives the ultrasound transducer to transmit the active echo pulse, or the series of active echo pulses, back to the boat sonar system.

In yet an additional aspect, the present invention provides an active echo system comprising an ultrasound transducer configured to detect an ultrasound signal and subsequently transmit an ultrasound energy pulse, or a series of ultrasound energy pulses. The active echo system further includes a signal amplifier configured to amplify the ultrasound signal, an analog-to-digital converter configured to digitize the ultrasound energy signal from the signal amplifier, and a microprocessor configured to receive the ultrasound signal from the analog-to-digital converter and control a pulser circuit. The pulser circuit drives the ultrasound transducer to transmit the ultrasound energy pulse, or the series of ultrasound energy pulses.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The invention will be better understood and features, aspects and advantages other than those set forth above will become apparent when consideration is given to the following detailed description thereof. Such detailed description makes reference to the following drawings.

DETAILED DESCRIPTION

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

Currently, fishing lures cannot be seen, on the ultrasound images provided by boat sonar systems due to their small size. Furthermore, passive reflectors cannot be effectively used because the reflectors would change the appearance and motion of the fishing lure. These effects are highly undesirable since they make the lure "unnatural" and will repel, rather than attract, a fish.

Due to the current limitations of fishing lures, it would be desirable to have a system that enables a fishing lure to appear on the ultrasound images provided by boat sonar systems. This would display the position of the fishing lure relative to the fish and/or various other underwater features. As will be described, an active echo system may be integrated with a fishing lure or other part of the general fishing environment. For example, the active echo system may also be mounted or attached to a fishing line or the weight associated with the fishing line, such as might be secured 15-30 cm above the fishing lure. Thus, the following non-limiting examples describe an active echo system integrated with the fishing lure. However, the active echo system may likewise be mounted, positioned, or integrated in other locations and achieve the described functionality.

Figure 1:
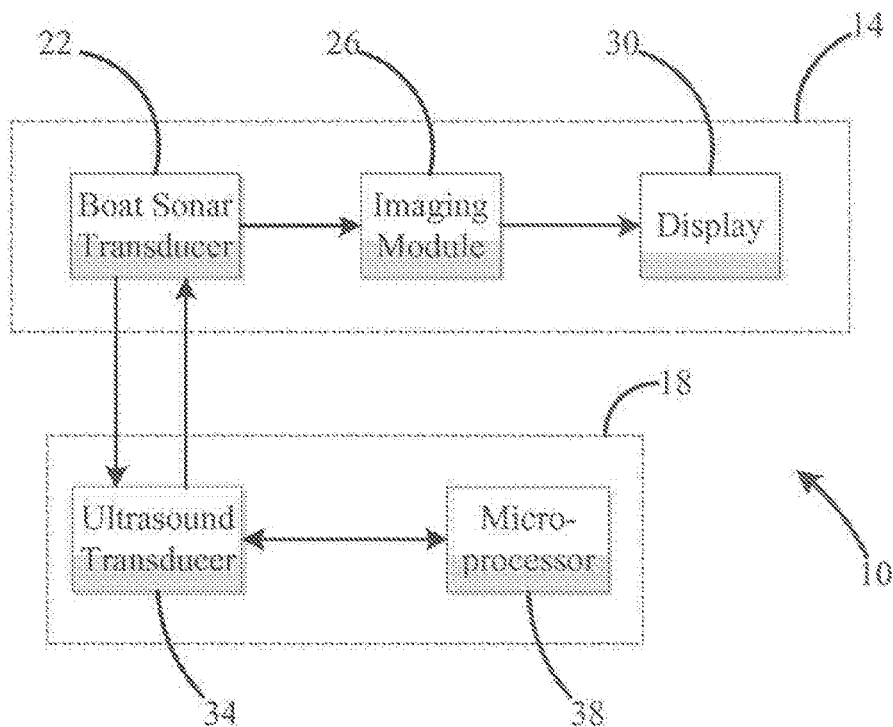
FIG. 1 shows a schematic of an underwater imaging system according to one embodiment of the invention.

FIG. 1 shows an underwater imaging system 10 including a boat sonar system 14 and an active echo system 18. The boat sonar system 14 includes a boat sonar transducer 22 configured to transmit and receive sonar signals, an imaging module 26 configured to process the sonar signals received by the boat sonar transducer 22 and display ultrasound images on a display 30. The boat sonar system 14 may be a stock off-the-shelf system, or a custom sonar system configured to interact with the active echo system 18. In another embodiment, the imaging module 26 and/or the display 30 may be constructed using a hand held device.

The active echo system 18 includes an ultrasound transducer 34 configured to detect sonar signals and transmit an active echo pulse, or a series of active echo pulses, and a microprocessor 38 configured to drive the ultrasound transducer 34 to transmit the active echo pulse, or the series of active echo pulses.

Figure 2:
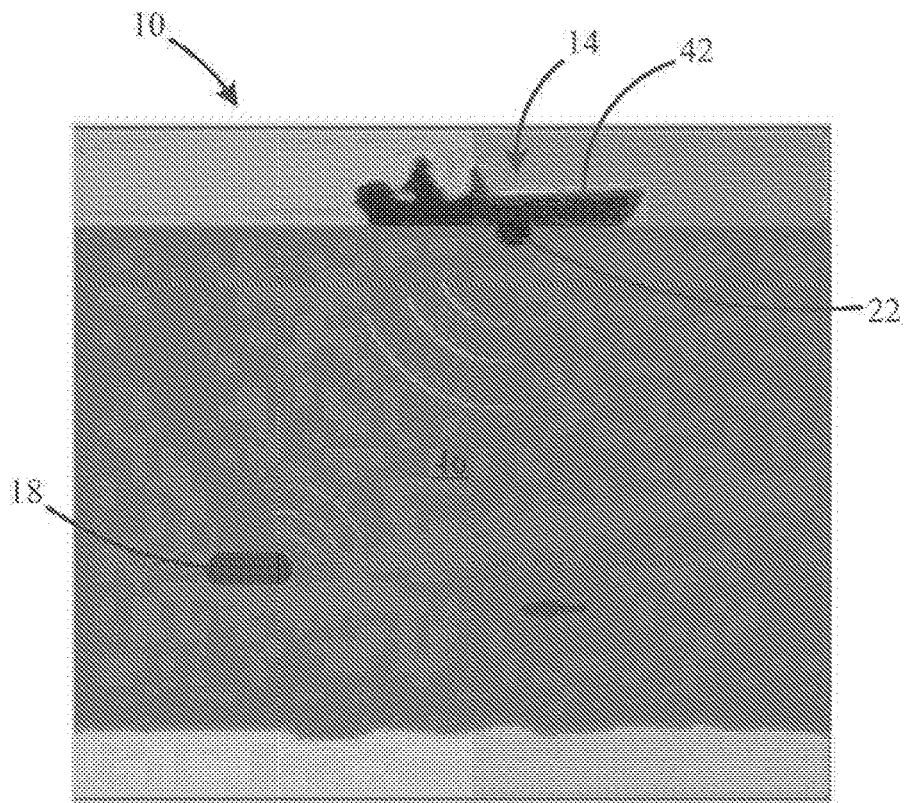
FIG. 2 shows a side view of the underwater imaging system of FIG. 1 illustrating the operation of the underwater imaging system by a boat.

Operation of the imaging system 10 will be described with reference to FIG. 1 and FIG. 2. The boat sonar transducer 22 is typically attached to the underside of a boat 42 and transmits sonar signals into water 46. The boat sonar transducer 22 receives echo sonar signals which are then processed by the imaging module 26. The display 30 then displays underwater ultrasound images illustrating the water 46 and surfaces under the boat 42 in the water 46.

The active echo system 18 is configured to be placed within the water 46 under the boat 42 at a distance from the boat 42. The sonar signals transmitted from the boat sonar transducer 22 are detected by the ultrasound transducer 34. Upon detection of the sonar signals from the boat sonar transducer 22, the microprocessor 38 drives the ultrasound transducer 34 to transmit the active echo pulse, or the series of active echo pulses, back to the boat sonar transducer 22. The boat sonar transducer 22 then receives the active echo pulse, or the series of active echo pulses, and the imaging module 26 identifies the active echo pulses, or the series of active echo pulses, within the echo sonar signals. The imaging module 26 then processes the relative distance from the boat 42 and position of the active echo system 18. The display 30 then displays underwater ultrasound images illustrating the position of the active echo system 18 relative to the boat 42 and relative to the surfaces under the boat 42 in the water 46.

Figure 3:
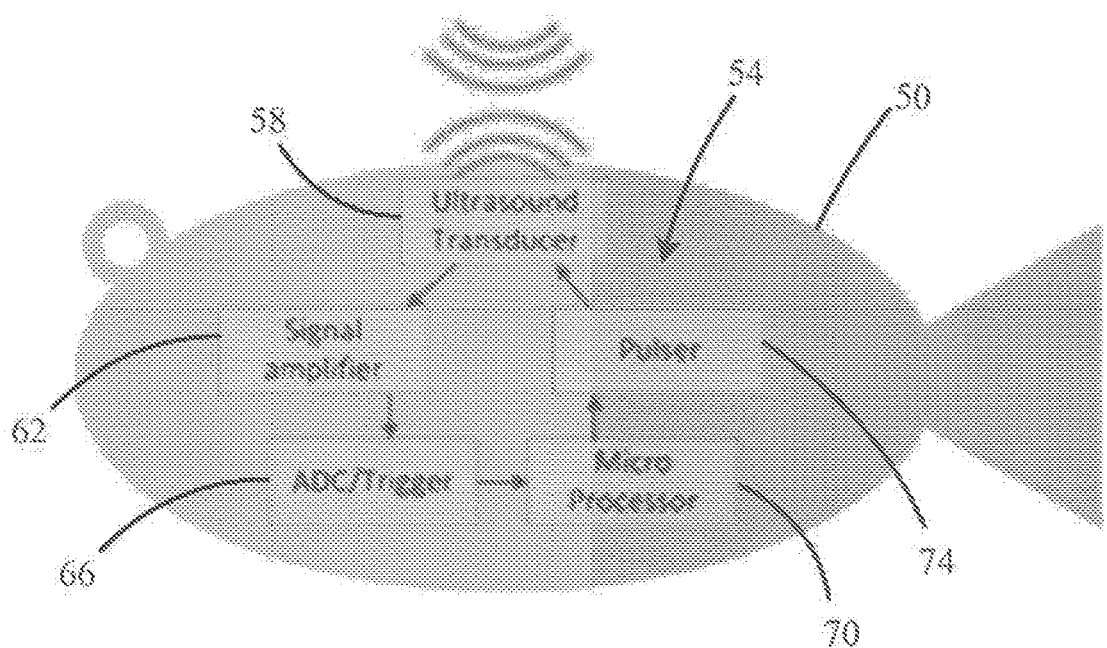
FIG. 3 shows a side view of a fishing lure including an active echo system according to one embodiment of the invention.

FIG. 3 shows a fishing lure 50 including an active echo system 54 integrated into the fishing lure or other fish-attracting device 50. The active echo system 54 includes an ultrasound transducer 58, a signal amplifier 62, a analog-to-digital converter (ADC) 66, a microprocessor 70, and a pulser circuit 74. In other configurations, the ultrasound transducer 58 may include a plurality of ultrasound transducer elements each configured to operate in the same or different frequency ranges.

Figure 4:
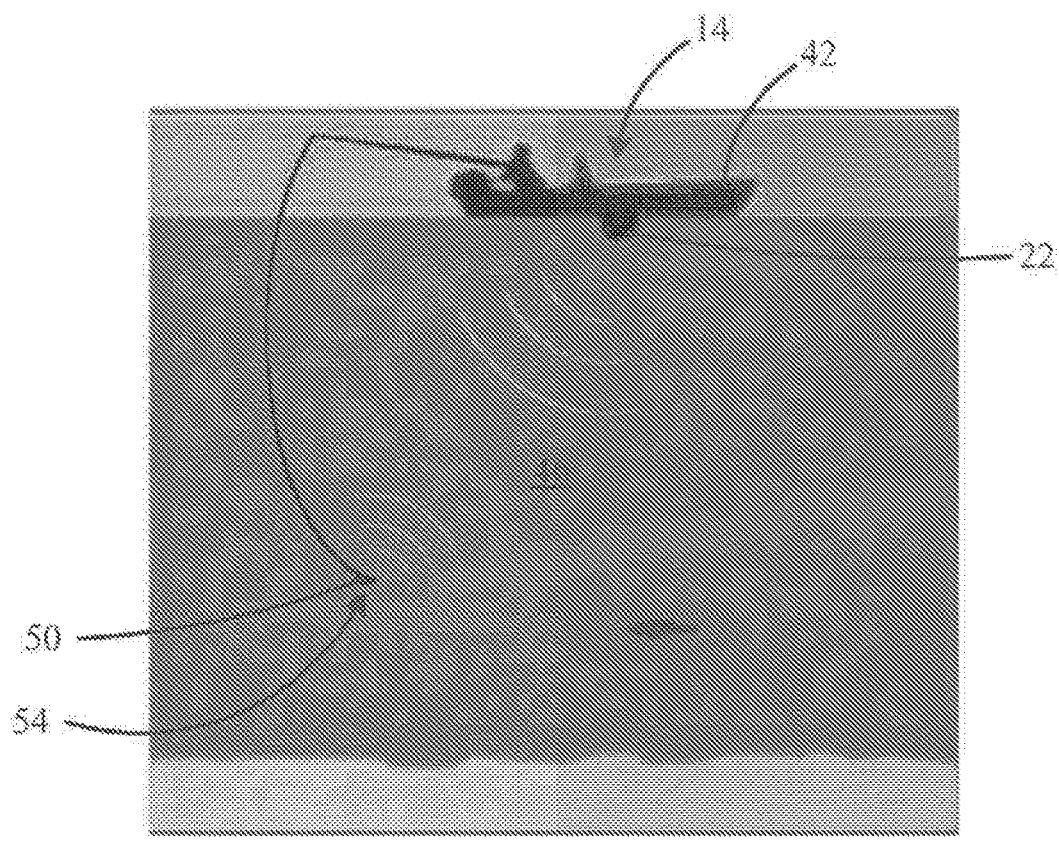
FIG. 4 shows a side view of the fishing lure of FIG. 3 illustrating the use of the fishing lure by a boat with a boat sonar system.

FIG. 4 shows the fishing lure 50 within the water 46 including the attached active echo system 54 interfacing with the boat sonar system 14 attached to the boat 42. In other embodiments, the boat sonar system 14 may interface with a plurality of fishing lures each including the active echo system 14.

In operation, the ultrasound transducer 58 of the active echo system 54 detects a signal, consisting of ultrasound pulses, sent from the boat sonar transducer 22 of the boat sonar system 14. Upon detection of the signal from the boat sonar transducer 22, the signal is amplified and digitized using the signal amplifier 62 and the ADC 66. The signal is then received by the microprocessor 70 where it is processed. The microprocessor 70 controls the pulser circuit 74, which then drives the ultrasound transducer 58 to transmit ultrasound energy in the form of an active echo pulse, or a series of active echo pulses, back to the boat sonar transducer 22 of the boat sonar system 14. In other configurations, the signal from the signal amplifier 62 may directly trigger an analog trigger circuit and bypass the ADC 66.

In some configurations, a time delay between the ultrasound transducer 58 detecting the signal from the boat sonar system 14 and transmitting the active echo pulse(s) may be very small, or negligible, causing the active echo pulse(s) to be superimposed with a passive reflection pulse. As a result, the boat sonar system 14 may detect a greatly enhanced active echo signal and display the fishing lure 50 as a bright spot on the display 30. The time delay between detection and transmission may be configured to a predetermined value. In other configurations, the fishing lure 50 may be illustrated on the display 30 as a pre-programmed virtual pattern that may vary in time and space for easy identification of one or more fishing lures.

Figure 5:
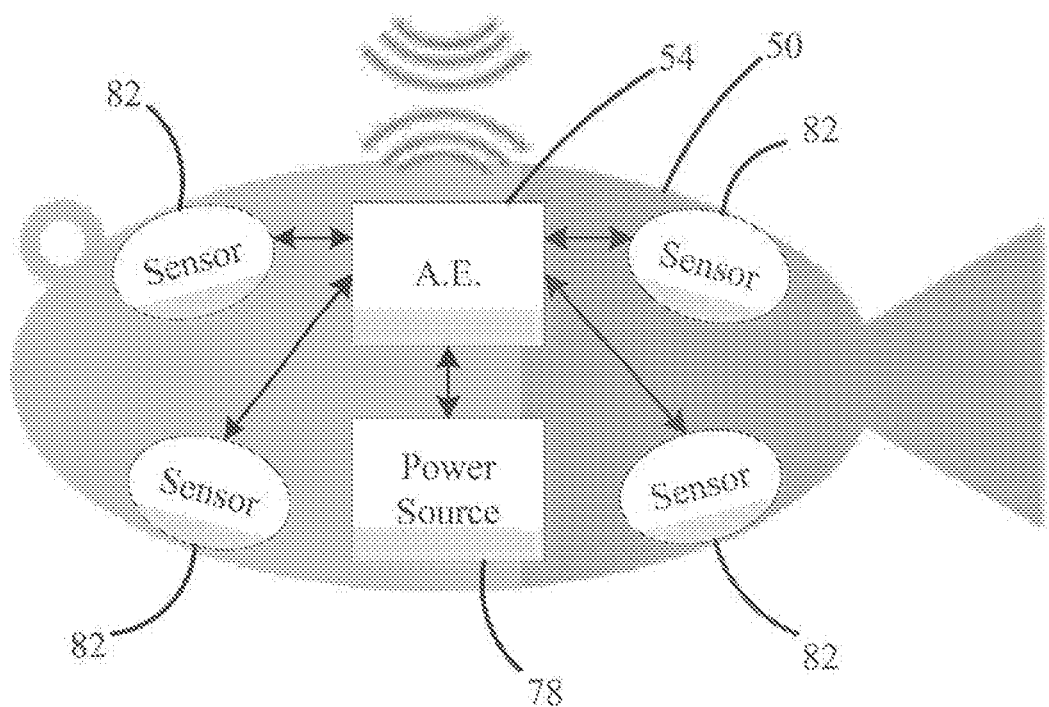
FIG. 5 shows a side view of a fishing lure including an active echo system and sensors according to one embodiment of the invention.

FIG. 5 shows the fishing lure 50 including the active echo system 54, a power source 78 integrated into the fishing lure, and a plurality of sensors 82 in communication with the active echo system 54. The power source 78 can be configured to supply power to the active echo system 54 and/or the sensors 82. The power source 78 may be a battery configured to charge wirelessly using solar energy, an induction charger, or any other wireless charging method known in the art. The sensors 82 can be configured to communicate pressure, temperature, depth, optical, electromagnetic, and/or auditio data to the active echo system 54.

In operation, the active echo system 54 can be configured to transmit data from the sensors 82 with the active echo pulse, or series of active echo pulses, back to the boat sonar system 14. The boat sonar system 14 can then combine data from the sensors 82 with the active echo information to determine a location of the fishing lure 50. For example, the boat sonar system 14 could use data from a pressure sensor to determine depth and combine that information with data from the active echo pulse, or series of active echo pulses, to determine an exact location of the fishing lure 50.

Figure 6:
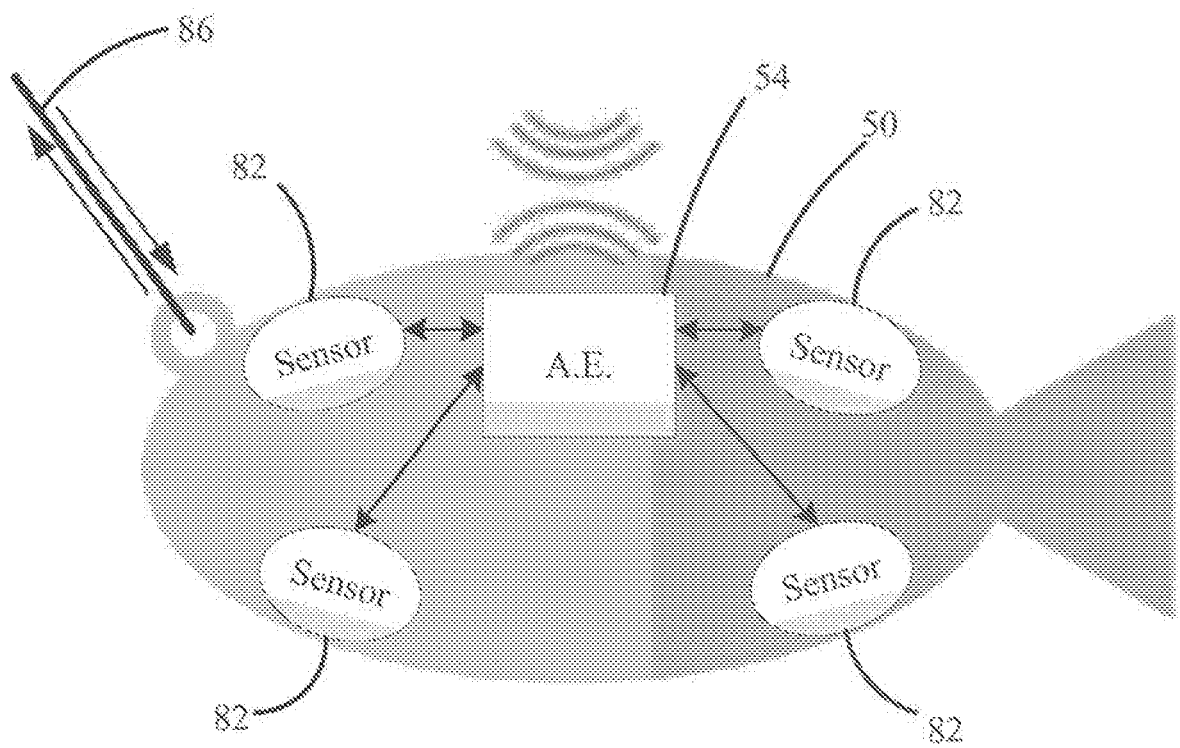
FIG. 6 shows a side view of a fishing lure including an active echo system, sensors, and electrical conducting fishing line according to one embodiment of the invention.

FIG. 6 shows the fishing lure 50 including the active echo system 54, the plurality of sensors 82, and an electrical conducting fishing line 86 supplying power to the active echo system 54 and/or the sensors 82. The electrical conducting fishing line 86 can be constructed by integrating an electrical conductor into a standard polymeric fishing line. In addition to providing power to the active echo system 54, the electrical conducting fishing line 86 can also be used to transmit active echo data and/or data from the sensors 82 back to the boat sonar system 14.

Figure 7:
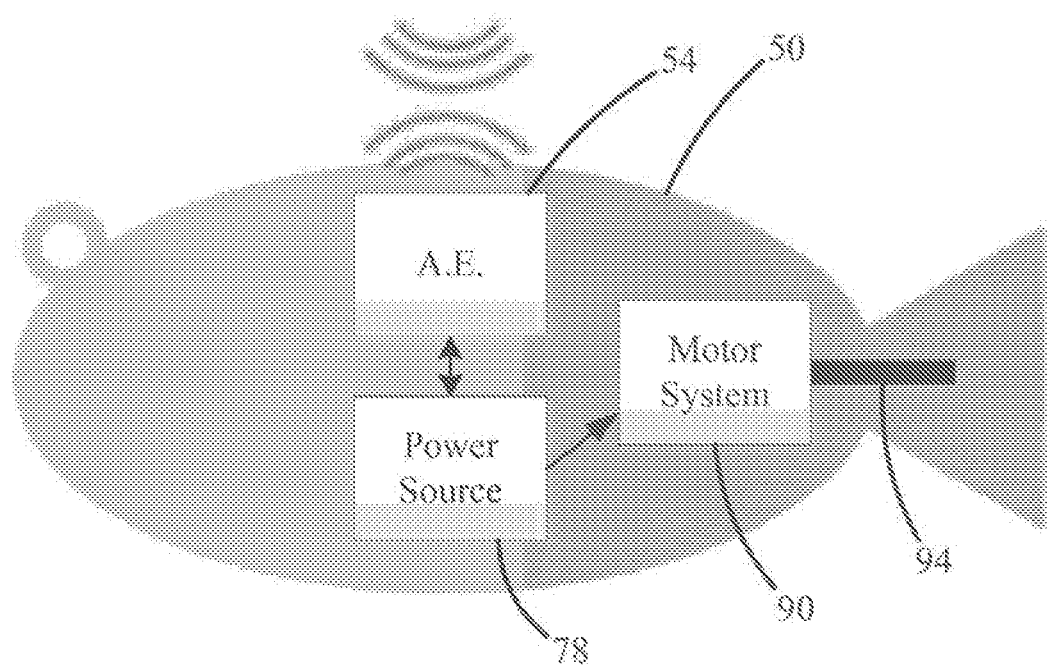
FIG. 7 shows a side view of a fishing lure including an active echo system and a motor system according to one embodiment of the invention.

FIG. 7 shows the fishing lure 50 including the active echo system 54, the power source 78, and a motor system 90 integrated into the fishing lure 50. The motor system 90 is configured to receive power from the power source 78 and is coupled to a steering member 94 that can be used to direct the fishing lure 50 to a specific location. In other embodiments, the fishing lure 50 may include one or more motor systems 90 each including a steering member 94 and integrated into the fishing lure 50 at a different location within the fishing lure 50.

In operation, the display 30 of the boat sonar system 14 can illustrate the position of the fishing lure 50 relative to the boat 42. Based on this information, a user of the fishing lure 50 can use a remote control (not shown) to communicate to the active echo system 54 to supply power, by means of the power source 78, to the motor system 90. Upon receiving power from the power source 78, the motor system 90 can actuate the steering member 94 and direct the fishing lure 50 towards a location underwater determined by the user. The communication between the remote control and the active echo system 54 can occur over a secondary ultrasonic channel different from a primary channel used for the active echo pulse, or series of active echo pulses. In another embodiment, the directional control of the fishing lure 50 using the motor system 90 and the steering member 94 may be controlled autonomously using the boat sonar system 14. In this embodiment, the boat sonar transducer 22 can be configured to communicate with the active echo system 54 using the secondary ultrasonic channel and direct the fishing lure 50 towards predetermined underwater features detected by the boat sonar system 14.

Figure 8:
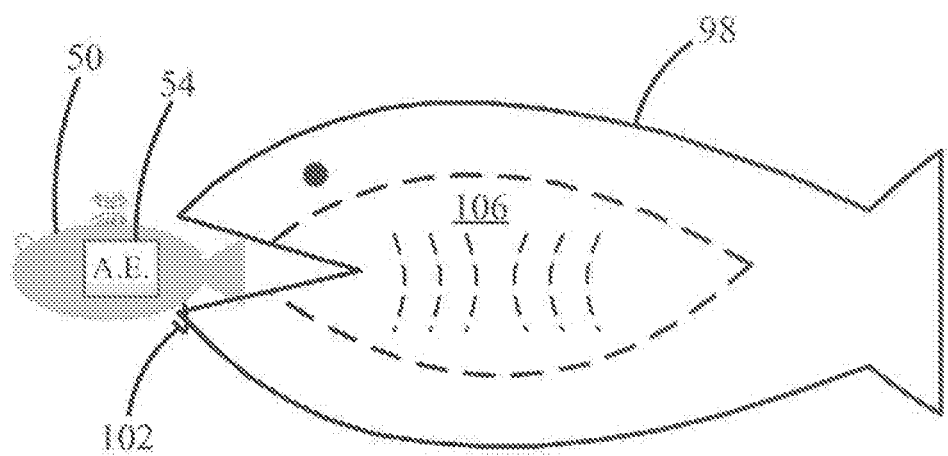
FIG. 8 shows a side view of a fish interacting with a fishing lure including an active echo system.

FIG. 8 shows the fishing lure 50 hooking a fish 98 with a hook 102. Upon hooking the fish 98, the active echo system 54 can use the ultrasound transducer 58 to send a series of high frequency active echo pulses, throughout an internal cavity 106 of the fish 98. A time between the ultrasonic transducer 58 detecting a first high frequency echo and a second high frequency echo can be used to correlate to a size of the fish 98. In the illustrated embodiment, the boat sonar system 14 can be configured to receive data containing the size of the fish 98 from the active echo system 54. In this embodiment, the user, upon determining if the fish 98 is of a legal size, can use the boat sonar system 14 to instruct the active echo system 54 to eject the hook 102 from the fishing lure 50, as shown in FIG. 9A and FIG. 9B.

Figure 9A:
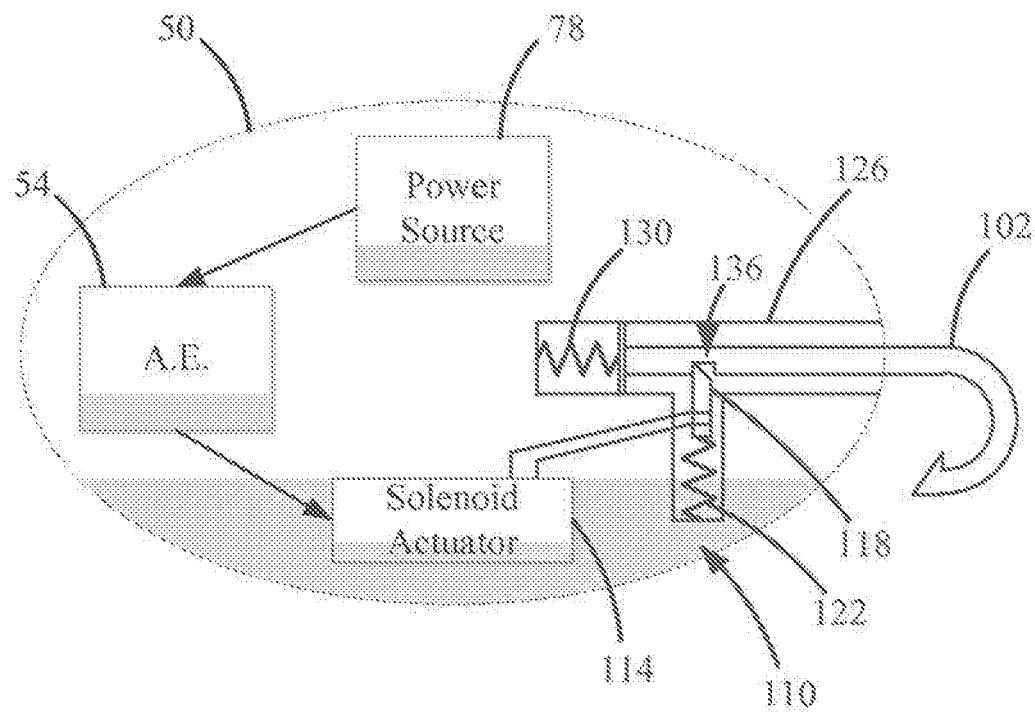
FIG. 9A shows a side view of a fishing lure including an active echo system and a hook ejecting system in a first position.
Figure 9B:
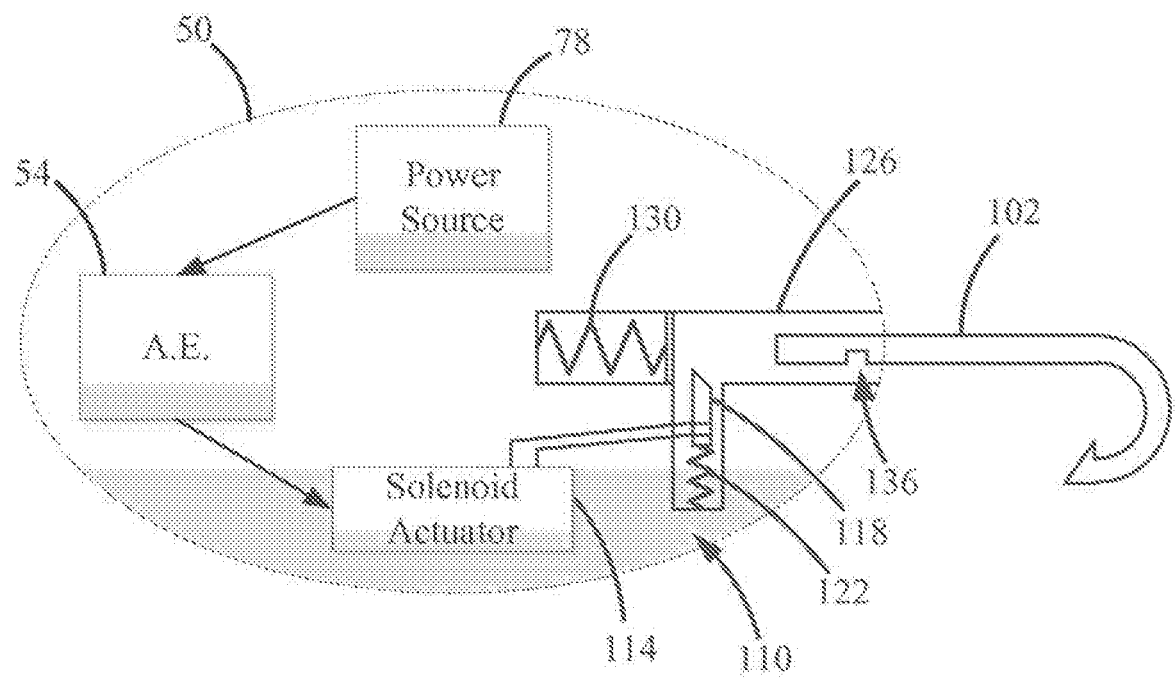
FIG. 9B shows a side view of the fishing lure of FIG. 9A with the hook ejecting system in a second position.

FIG. 9A shows the fishing lure 50 including the active echo system 54, the power source 78, and a hook ejection system 110 integrated into the fishing lure 50 and coupled to the hook 102. The hook ejection system 110 includes a solenoid actuator 114 in communication with the active echo system 54 and coupled to an actuating member 118. The actuating member 118 is attached to the fishing lure 50 using a first spring 122. The hook 102 is arranged within a channel 126 of the fishing lure 50 and is abutted against a second spring 130 within the fishing lure 50. The hook includes a notch 136 that engages the actuating member 118.

In operation, the solenoid actuator 114 is by default in a first position, shown in FIG. 9A, where the actuating member 118 engages the notch 136 in the hook 102 thereby securing the hook 102 within the channel 126 of the fishing lure 50. Upon receiving instructions to eject the hook 102 from the boat sonar system 14, the active eco system 54 can instruct the solenoid actuator 114 to move to a second position, shown in FIG. 9B. When the solenoid actuator 144 is moving toward the second position, the actuating member 118 disengages the notch 136 in the hook 102 thereby ejecting the hook 102 from the channel 126 of the fishing lure 50. The instructions between the boat sonar system 14 and the active echo system 54 pertaining to the hook ejection system 110 may be communicated over the secondary ultrasonic channel, described above.

Figure 10:
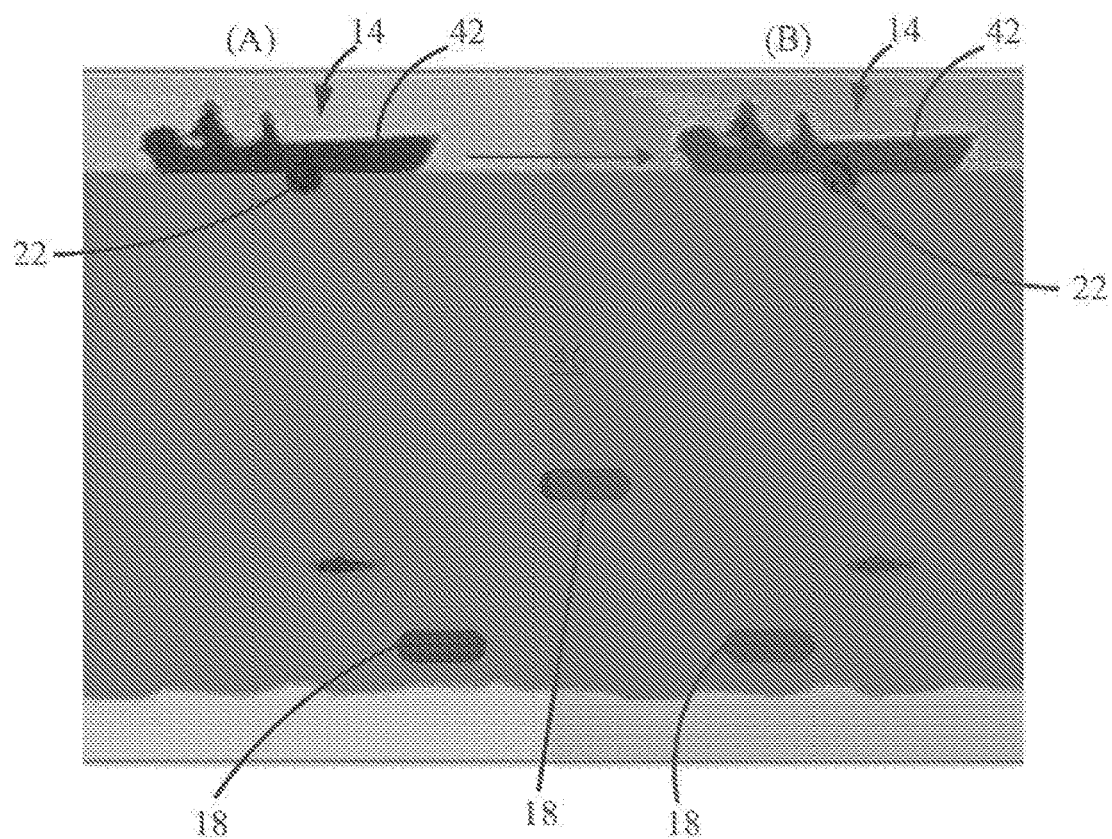
FIG. 10 shows a side view of a boat including a boat sonar system interacting with a plurality of active echo systems.

FIG. 10 shows a plurality of active echo systems 18 within the water 46 interfacing with the boat sonar system 14 attached to the boat 42 as the boat 42 travels from a first location (A) to a second location (B). By moving the boat sonar system 14 over the plurality of active echo systems 18, the boat sonar 14 can use each active echo system 18 as a reference point, allowing better localization of the sonar data. This can enable the boat sonar system 14 to utilize synthetic aperture imaging and produce underwater ultrasound images with enhanced resolution.

Figure 11:
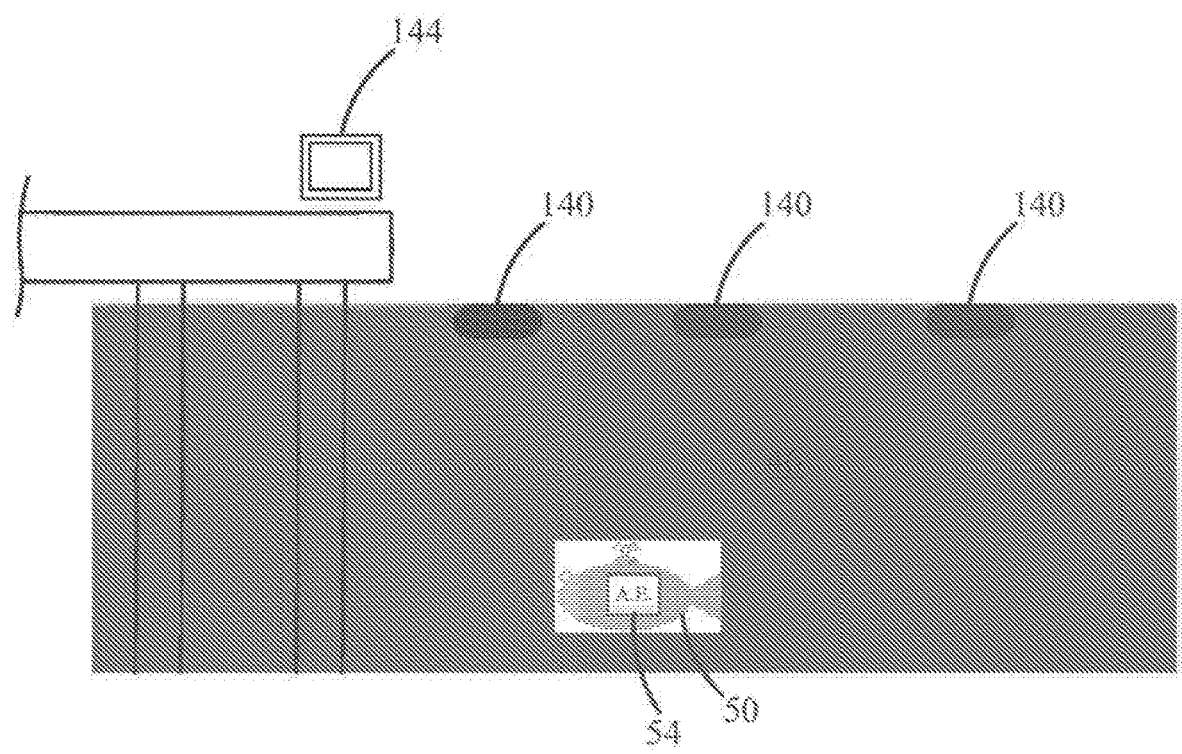
FIG. 11 shows a side view of a plurality of floating transducers and a fishing lure including an active echo system illustrating the use of the active echo system in a non-boat fishing application.

FIG. 11 shows a plurality of floating ultrasonic transducers 140 interfacing with the fishing lure 50 including the active echo system 54. The plurality of floating ultrasonic transducers 140 are in wireless communication with a central display 144. The central display 144 may be constructed to be a hand held device. These floating ultrasonic transducers can be integrated in a robotically controlled floating object, similar to Sphero, by goshero.com. In a typical operation, plastic fins can be added to these robotic objects to facilitate its motion in water. The same tablet device can control more than one robotic unit, and can program different trajectories from simple line path to any sophisticated shape.

In operation, a position of each floating ultrasonic transducer 140 can be localized in 2-D space using GPS, camera triangularization, or any other known localization method known in the art. The plurality of floating ultrasonic transducers 140, when considered together, can then be used to localize the active echo system 54 and wirelessly communicate the location of the active echo system 54 to the central display 144 using Bluetooth®, WiFi, or any other wireless communication technique known in the art. Upon receiving the location of the active echo system 54, the central display 144 can display the location of the fishing lure 50 relative to the plurality of floating ultrasonic transducers 140, other surfaces in the water 46.

It is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A computing device can be programmed to execute the steps of the method of the present invention. A computing device for use with the present invention can be loaded with a non-transitory computer readable medium configured to execute activities associated with the present invention. The computing device can be incorporated into the sonar system. Alternately, the computing device can be networked to a server or other computing device configured to execute activities associated with the system. The computing device can also be networked to the sonar either wired or wirelessly in order to obtain the information from the sonar for processing. The information from the sonar can also be input into the computing device manually or using magnetic, optical, or other computer readable medium.

As used herein, a non-transitory computer readable medium can be any article of manufacture that contains data that can be read by a computer. Such computer readable media includes but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; and paper media, such as punched cards and paper tape. The computer readable medium contains code such that the method described herein can be executed.

The above discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A system, comprising:
 a boat sonar transducer configured to be attached to an underside of a boat to transmit sonar signals to an active echo system and into an underwater environment and to receive active echo sonar signals from the active echo system and reflected sonar signals associated with the underwater environment,
 the active echo system being integrated into a fishing lure and configured to be positioned at a distance from the boat to remotely communicate with the boat sonar transducer,
 the active echo system being triggered based on detecting the sonar signals transmitted by the boat sonar transducer,
 the active echo system being separate from the boat sonar transducer, and
 the active echo system including:
  an ultrasound transducer configured to detect the sonar signals transmitted by the boat sonar transducer;
  a signal amplifier configured to amplify the sonar signals detected by the ultrasound transducer;
  an analog-to-digital converter configured to digitize amplified sonar signals received from the signal amplifier; and
  a microprocessor configured to drive the ultrasound transducer to transmit the active echo sonar signals to the boat sonar transducer in response to the ultrasound transducer detecting the sonar signals transmitted by the boat sonar transducer; and
 an imaging device configured to:
  process the reflected sonar signals received by the boat sonar transducer,
  provide, for display, first ultrasound images associated with the underwater environment based on processing the reflected sonar signals received by the boat sonar transducer,
  process the active echo sonar signals received by the boat sonar transducer, and
  provide, for display, second ultrasound images based on processing the active echo sonar signals received by the boat sonar transducer, wherein the second ultrasound images are associated with data relating to the underwater environment.

2. The system of claim 1, wherein a time delay between the ultrasound transducer detecting the sonar signals transmitted by the boat sonar transducer and transmitting the active echo sonar signals is preconfigured.

3. The system of claim 2, wherein the time delay is set to a predetermined value.

4. The system of claim 1, wherein the microprocessor is further configured to:
control a pulser circuit that is configured to drive the ultrasound transducer to transmit the active echo sonar signals.

5. The system of claim 1, wherein the imaging device is further configured to:
identify an active echo pulse, or a series of active echo pulses within the active echo sonar signals received.

6. The system of claim 5, wherein the imaging device is configured to:
illustrate a position of the active echo system relative to the boat and surfaces under the boat.

7. The system of claim 6, wherein the active echo system is illustrated on the imaging device as a pre-programmed virtual pattern.

8. The system of claim 7, wherein the pre-programmed virtual pattern varies in time and space.

9. The system of claim 6, wherein the imaging device is constructed to be a hand held device.

10. The system of claim 5, further comprising:
one or more sensors in communication with the active echo system.

11. The system of claim 10, wherein the one or more sensors are configured to communicate data, to the active echo system, the data including at least one of:
pressure data,
temperature data,
depth data,
optical data,
electromagnetic data, or
audio data, and
the active echo system being configured to transmit the data from the one or more sensors to the boat sonar transducer.

12. The system of claim 11, wherein the imaging device is further configured to:
identify the data from the one or more sensors within the active echo sonar signals received.

13. The system of claim 5, wherein the imaging device is further configured to:
identify an active echo pulse, or a series of active echo pulses, within the active echo sonar signals received from one or more active echo systems.

14. The system of claim 13, wherein the imaging device is capable of utilizing synthetic aperture imaging.

15. A system, comprising:
a first ultrasound transducer configured to be positioned in a body of water to transmit sonar signals to an active echo system and into an underwater environment and to receive active echo sonar signals from the active echo system and reflected sonar signals associated with the underwater environment,
the active echo system being configured to be positioned at a distance from the first ultrasound transducer to remotely communicate with the first ultrasound transducer,
the active echo system being triggered based on detecting the sonar signals transmitted by the first ultrasound transducer,
the active echo system being separate from the first ultrasound transducer, and
the active echo system including:
a second ultrasound transducer configured to detect the sonar signals transmitted by the first ultrasound transducer;
a signal amplifier configured to amplify the sonar signals detected by the second ultrasound transducer;
an analog-to-digital converter configured to digitize the amplified sonar signals from the signal amplifier; and
a microprocessor configured to drive the second ultrasound transducer to transmit the active echo sonar signals to the first ultrasound transducer in response to the second ultrasound transducer detecting the sonar signals transmitted by the first ultrasound transducer; and
an imaging device configured to:
process the reflected sonar signals received by the first ultrasound transducer,
provide, for display, first ultrasound images associated with the underwater environment based on processing the reflected sonar signals received by the first ultrasound transducer,
process the active echo sonar signals received by the first ultrasound transducer, and
provide, for display, second ultrasound images based on processing the active echo sonar signals received by the first ultrasound transducer,
wherein the second ultrasound images are associated with data relating to the underwater environment.

16. The system of claim 15, wherein the first ultrasound transducer is configured to be attached to an underside of a boat.

17. The system of claim 15, wherein the first ultrasound transducer is configured to float in the body of water.

18. The system of claim 15, wherein the active echo system is integrated into a fishing lure.

19. The system of claim 15, wherein the microprocessor is further configured to:
control a pulser circuit that is configured to drive the second ultrasound transducer to transmit the active echo sonar signals.

* * * * *